United States Patent [19]

Mori

[11] Patent Number: 5,129,680
[45] Date of Patent: Jul. 14, 1992

[54] PRELOADER SENSOR AND MECHANISM FOR SECURING WEBBING RETRACTOR

[75] Inventor: Shinji Mori, Aichi, Japan

[73] Assignee: Kabushiki Kaisha Tokai-Rika-Denki-Seisakusho, Japan

[21] Appl. No.: 669,103

[22] Filed: Mar. 13, 1991

[30] Foreign Application Priority Data

Mar. 27, 1990 [JP] Japan ............... 2-31656[U]

[51] Int. Cl.$^5$ .............................................. B60R 22/16
[52] U.S. Cl. ...................................... 280/806; 280/807;
180/282
[58] Field of Search .................. 280/806, 807; 180/282

[56] References Cited

U.S. PATENT DOCUMENTS

| | | | |
|---|---|---|---|
| 4,508,287 | 4/1985 | Nilsson | 280/806 |
| 4,508,288 | 4/1985 | Nilsson | 280/806 |
| 4,889,068 | 12/1989 | Tabata et al. | 280/806 |
| 4,968,059 | 11/1990 | Motozawa et al. | 280/806 |
| 5,037,134 | 8/1991 | Tabada | 280/806 |

*Primary Examiner*—Kenneth R. Rice
*Attorney, Agent, or Firm*—Sixbey, Friedman, Leedom & Ferguson

[57] ABSTRACT

A preloader sensor which is applied to a webbing retractor for winding a webbing for constraining a vehicle passenger, onto a winding shaft in a stratified arrangement, in order to activate operation of a preloader for tightly holding each passenger with the webbing immediately upon instantaneous detection of rapid deceleration of vehicle speed. The preloader sensor comprises the following; a sensor unit incorporating a mechanism for detecting rapid deceleration of vehicle speed; a releasing member which causes a mass-substance receptive member to enter into a displaceable or an undisplaceable condition, this releasing member causing the mass-substance receiving member to enter into a displaceable, operation capable condition only when the releasing member is moved to a specific position as a result of receiving a predetermined amount of pressure from a fastened bolt, and causing the mass-substance receiving member to move into an undisplaceable condition when the releasing member is moved to a specific position free of pressure from the fastened bolt, and further, this releasing member being capable of moving from one to the other of the pressure-affected position and the pressure-free position; and an energizing means which constantly exerts a force on the releasing and causes it to move when it is at the position free of the pressure of the fastened bolt. Thus, the preloader sensor is reliably prevented from operating under any conditions except for that in which the webbng retractor is perfectly secured to the vehicle body, by virtue of the bolt being screwed in a predetermined amount.

21 Claims, 9 Drawing Sheets

PRELOADER SENSOR AND MECHANISM FOR SECURING WEBBING RETRACTOR

BACKGROUND OF THE INVENTION

1. Field of the Invention

The present invention relates to a pre-loader sensor unit for activating the functional operation of a pre-loader which is applicable to a webbing retractor of a seat belt device, which enables the device to tightly constrain a vehicle passenger with a webbing when the vehicle speed quickly decelerates, and furthermore, the invention also relates to mechanism for securing the webbing retractor to the vehicle body.

2. Description of Related Art

A conventional seat belt installed in a vehicle body constrains the driver and passengers by means of a webbing when the vehicle speed quickly decelerates. However, if there is a large interval between the webbing and the driver, the constraining effect cannot be fully exerted. To compensate for this, a webbing retractor has been devised which is integrated with a preloader for tightly constraining the driver with a webbing by forcibly pulling the webbing in the retracting direction when the vehicle speed quickly decelerates. The preloader is provided with a preloader sensor. When the vehicle speed quickly decelerates, the preloader sensor operates and activates the preloader. The preloader sensor is provided with a safety device which enables the alternation of the preloader sensor to one or the other of an operation-capable and a non-operational state, by a manual adjustment.

It is essential that the functional operation of the preloader sensor be correctly activated, that is, activated only when the vehicle speed quickly decelerates. Concretely, it is essential for the functional operation of the preloader sensor to be reliably blocked until after the webbing retractor has been completely installed in the vehicle body, and alos, to be blocked if and when the webbing retractor is removed from the vehicle body. It is also essential for the functional operation of the preloader sensor to be blocked when the webbing retractor is being transported before it is installed in the vehicle body or after it is removed from the vehicle body.

In a conventional webbing retractor provided with a conventional preloader sensor, such safety devices are typically separate from and independent of the mechanical parts for installing the webbing retractor in the vehicle body. Because of this, the process of installing the webbing retractor in the vehicle body by means of fixing parts must be executed independently of the process of effecting the operational (operation-capable) state of the preloader sensor through the adjustment of a safety device.

Further, such fixing parts have the function of securing the webbing retractor to the vehicle body, whereas the safety device merely has the functions of blocking and activating the operational state of the preloader. As a result, it is likely that vibration which occurs in the course of installing or removing the webbing retractor in and from the vehicle body will be transmitted to the operational center of the preloader sensor, thus causing the preloader sensor to malfunction. The same applies to the case of transporting the webbing retractor as well.

SUMMARY OF THE INVENTION

The object of the invention is to fully solve the problems mentioned above by providing a novel preloader sensor which is reliably prevented from entering into an operational state unless the webbing retractor has been perfectly secured to the vehicle body.

To achieve the above object, the present invention provides a preloader sensor which is secured to a webbing retractor for winding a webbing around a winding shaft in stratified form and which serves to detect rapid deceleration of vehicle speed and to activate operation of a preloader upon detection thereof, so as to instantaneously constrain the driver and passengers with the webbing upon such deceleration, wherein the preloader sensor embodied by the invention comprises the following;

a sensor which incorporates a mechanism for detecting quickly decelerating vehicle speed, wherein said mechanism incorporates a mass substance and a mass-substrate-receiving member which is capable of receiving displaced mass substance and detecting quickly decelerating vehicle speed on the basis of the positional displacement of said mass-substance receiving member which takes place simultaneously with the quick deceleration of vehicle speed;

a releasing means which causes the mass-substance receiving member to enter into a displaceable condition and an undisplaceable condition, by virtue of the movement of said releasing means from one to another of a pressure-receiving position and a pressure absent position; and more specifically, which causes the mass-substance receiving member to enter into the displaceable condition when said releasing means is moved to the predetermined position at which it receives a predetermined amount of external pressure, in order to make the mass-substance receiving member operative unless and until the releasing means is returned to the position free of external pressure.

an urging means which constantly urges said releasing means towards the position mentioned above which is free from external pressure.

Furthermore, the webbingk-retractor securing mechanism embodied by the invention is characterized by the following:

The webbing-retractor securing mechanism for securing the webbing retractor to the vehicle body is provided with a preloader sensor to activate the functional operation of a preloader which causes the webbing to tightly hold the driver and passenger in the event that the vehicle speed quickly decelerates. The webbing-retractor securing mechanism comprises the following; a securing means which secures the webbing retractor to the vehicle body; and a releasing means which interacts with the preloader sensor to cause this sensor to enter into the operative or operation-inhibited conditions respectively. The operative condition is entered only when the webbing retractor is perfectly secured to the vehicle body by said securing means, whereas the operation-inhibited condition is entered whenever the webbing retractor is imperfectly secured to the vehicle body.

The functional operation of the preloader sensor embodying the present invention is described below with reference to the processes of securing the webbing retractor incorporating the preloader sensor to the vehicle body and removing the webbing retractor therefrom.

In order to secure the webbing retractor to the vehicle body, first, part of the webbing retractor is fixed to the vehicle body. Next, the main body of the webbing retractor is firmly secured to the vehicle body by causing fixing means like a bolt to interfere with a releasing means for releasing the preloader sensor in resistance against force generated by an urging means. When the installation work is completed, the webbing retractor is firmly connected to the vehicle body and concurrent with the installation the fixing means moves the releasing means so that the preloader sensor can enter into the operative condition.

Conversely, in order to remove the webbing retractor from the vehicle body, first, part of the webbing retractor is released from the vehicle body. Next, the fixing bolt is freed from the condition of interference with the releasing means. When the interfering condition stops, the releasing means is brought back to the position in which the preloader sensor enters into the operation-inhibited condition by the effect of the force generated by an urging means. This urging means then retains the preloader sensor in the operation-inhibited condition.

As is clear from the above description, the preloader sensor and the webbing-retractor securing mechanism embodied by the invention are provided with the advantageous function of bringing the preloader sensor into operative and inoperative conditions by effectively applying and releasing pressure generated by a fixing means like a bolt. As a result, the functional operation of the preloader sensor is fully inhibited in all conditions except for the case in which the webbing retractor is perfectly secured to the vehicle body.

DESCRIPTION OF THE PREFERRED EMBODIMENTS

Referring now more particularly to FIGS. 1 through 9, details of a webbing retractor 10 combined with a preloader sensor and webbing-retractor securing mechanism as an embodiment of the invention are described below. The arrowed directions FR, UP, and IN, shown in these accompanying drawings respectively designate forward upward and inward directions with respect to the vehicle.

Figure 1:
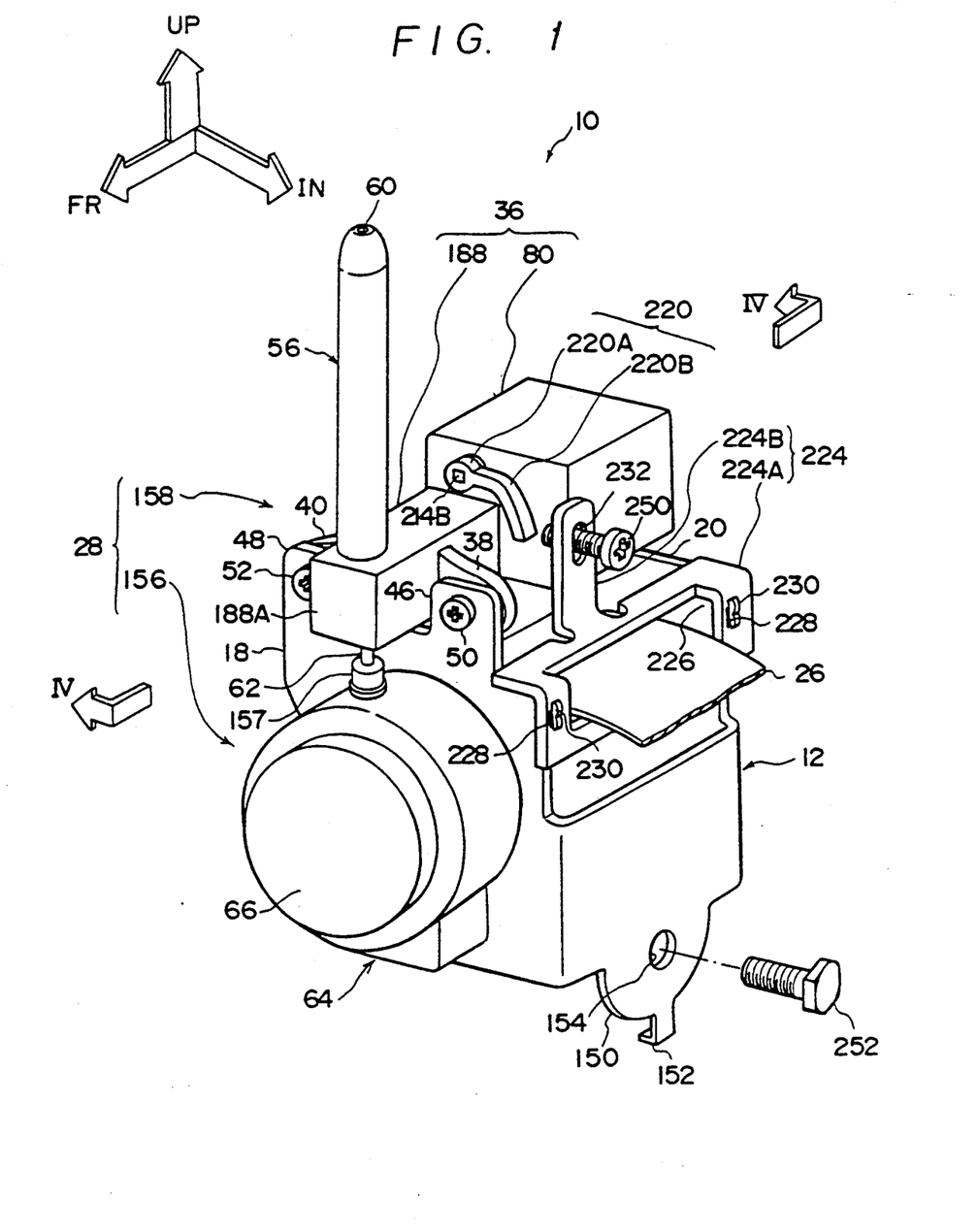
FIG. 1 is a schematic perspective view illustrating the webbing retractor with the preloader sensor embodied by the invention applied thereto.

FIG. 1 designates a schematic perspective view of the webbing retractor 10, which is provided with a )-shaped main frame as seen from directly above. A semicircular projection 150 projects downward with respect to the vehicle body. A hook member 152 is integrally provided together with a semicircular projection at the bottom edge of this projection 150. A through hole 154 is provided through the center of the semicircular projection 150 for inserting a bolt therethrough.

Figure 2:
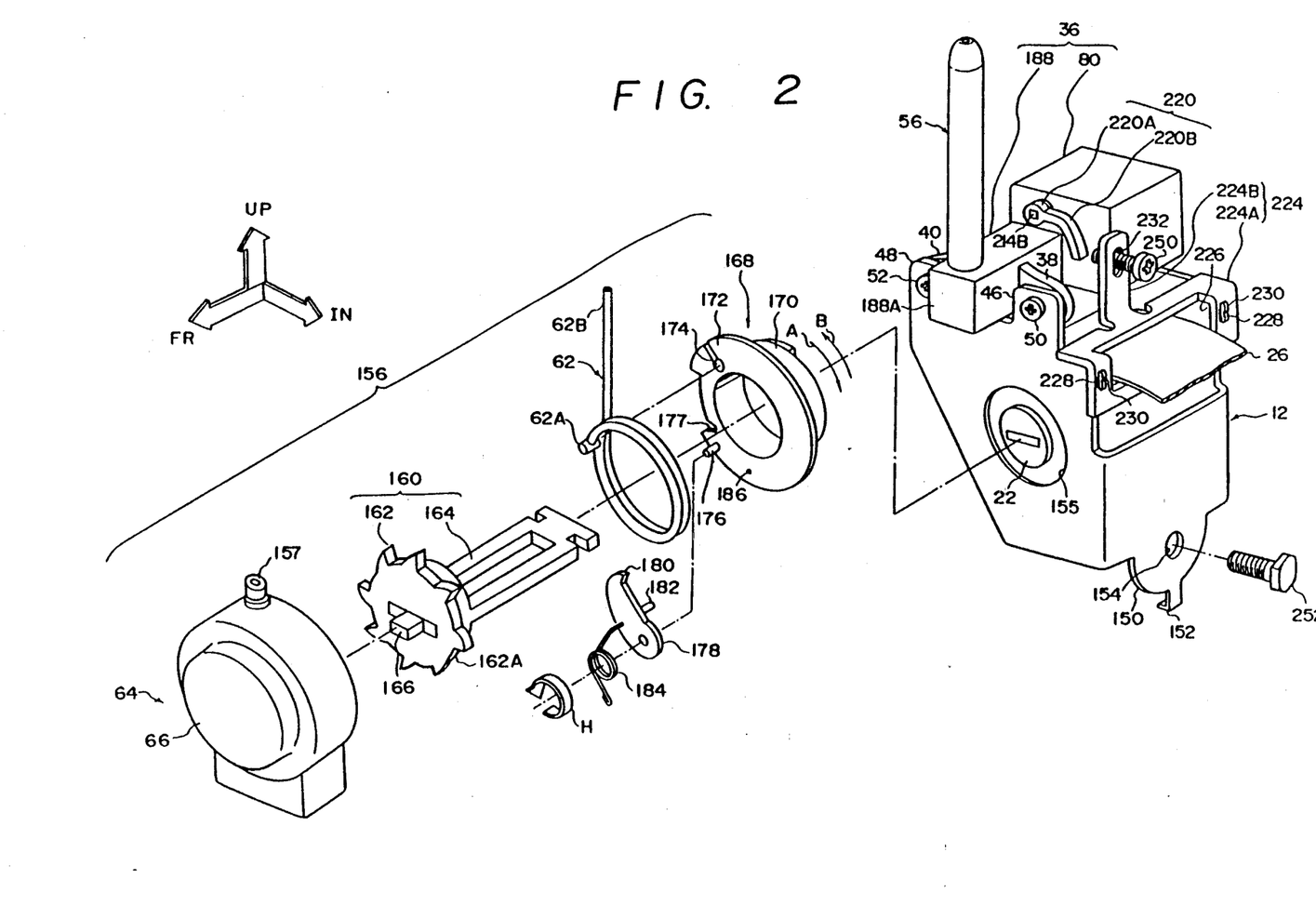
FIG. 2 is a partially disassembled perspective view of the clutch system of the preloader shown in FIG. 1.

A pair of foot plates 18 and 20 are provided for the main frame 12 in parallel with each other, where both sides of these foot plates 18 and 20 are orthogonally bent in the direction of the exterior of the vehicle cabin. As shown in FIG. 2, a shaft supporting hole 155 is provided for each of these foot plates 18 and 20 through the center of these plates (only the hole provided for the foot plate 18 is shown in FIG. 2). Both ends of a winding shaft 22 (see FIG. 2) are held in the through hole 155. A spool (not shown) is secured to the upper middle portion of the winding shaft 22. The base edge of a webbing 26 for constraining the vehicle driver is engaged with this spool.

As shown in FIG. 1, the webbing retractor 10 is provided with a preloader 28 consisting of a clutch unit 156 positioned alongside of the foot plate 18 and a sensor unit 158 which is disposed above the pair of foot plates 18 and 20.

As shown in FIG. 2, the clutch unit 156 is provided with a "spring complete unit" 64. The spring complete unit 64 has a covering member 66 projecting forward. A guide member 157 for guiding a wire 62 (to be described later on) is provided on the spring complete unit 64. A latchet wheel 160 is housed in the spring complete unit 64. A latchet member 162 is integrated with a shaft 164 to make up the latchet wheel 160. The shaft member 164 is connected to the winding shaft 22 so that both shafts can rotate together. Latchet teeth 162A are provided on the external circumference of the latchet member 162. A boss member 166 projects from the shaft axis in a direction opposite to the direction of projection of shaft 164. The boss member 166 is connected to the spring complete unit 64. A spring (not shown) in housed in the cover member 66 of the spring complete unit 64 and the external end of this spring is engaged with this cover member 66. The internal end of this spring is engaged with the base member 166 of the latchet wheel 160. By virtue of this mechanism, the winding shaft 22 receives a force from the spring via the latchet wheel 160, causing the winging shaft 32 to be urged in the direction of retracting the webbing (in the arrow B direction shown in FIG. 2), and as a result, the webbing 26 is wound up in stratified form. The webbing 26 can be pulled outward by rotating the winding shaft 22 and the latchet wheel 160 in the pull-out direction (in the arrow A direction shown in FIG. 2) in resistance against the force exerted by the spring stored in the cover member 66.

A cylindrical rotary drum 168 is coaxially disposed around the shaft member 164 of the latchet wheel 160 and between the foot plate 18 and the spring complete unit 64. The external circumferential surface of the cylindrical rotary drum 168 makes up the webbing retracting drum 170. A disc-shaped flange 172 is secured to the axial end of the complete spring unit 64.

A key-shaped engaging hole 174 is provided through the external circumference of the disc-shaped flange 172. The disc-shaped flange 172 is provided with a pin 176 which projects in the direction of the spring complete unit 64 and axially with respect to the cylindrical rotary drum 168. A recess 177 is formed between the engaging hole 174 and the pin 176 and extends from the external circumferential edge of the disc-shaped flange 172 to the webbing retracting drum 170.

A pole lever 178 is coupled with the pin 176 of the cylindrical rotary drum 168. The pole lever 178 engages with the latchet wheel 160 by virtue of a tip claw 180 of the pole lever 178 being engaged with the latchet teeth 162A of the latchet 160. A projection 182 projecting in the direction of the cylindrical rotary drum 168 is provided at the center of the pole lever 178. The pin 176 of the cylindrical rotary drum 168 is provided with a twisted coil spring 184 which is coaxial with the pole lever 178. One end of this twisted coil spring 184 is engaged wtih an engaging hole 186 of the disc-shaped flange 172, and the other end of the twisted coil spring 184 is engaged with the pin lever 178. By virtue of this mechanism, the twisted coil spring 184 exerts a force which urges tip claw 180 of the pole lever 178 in the direction of disengagement from the latchet teeth 162A (in the arrow H direction shown in FIG. 2). Therefore, normally, due to the force exerted by the twisted coil spring 184, the latchet wheel 160 can rotate independently of the cylindrical rotary drum 168, in the directions of winding and unwinding the webbing 26.

The middle section of a rope-like wire 62 is wound on the winding member 170 of the cylindrical rotary drum 168 by winding the projection 182 of the pole lever 178 around the winding member 170. One end 62A of the wire 62 is engaged with the disc-shaped flange 172 through the engaging hole 174. The other end 62B of the wire 62 is engaged with a piston 61 contained in a cylinder 56 which is positioned vertically and fixed to a certain position on the sensor unit 158 to be described below.

Figure 3:
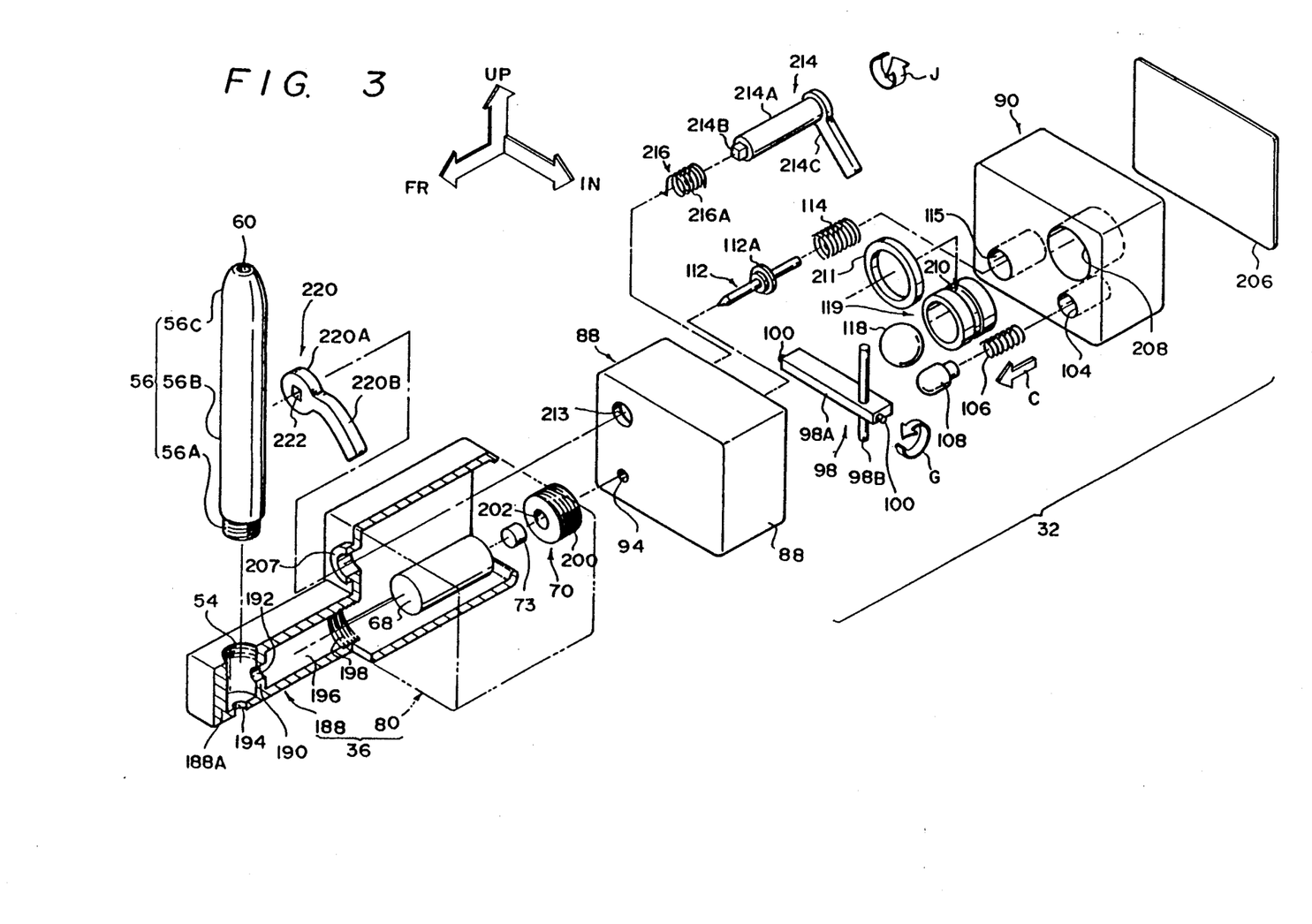
FIG. 3 is a disassembled perspective view of the preloader sensor of the preloader shown in FIG. 1.

As shown in FIG. 1, the sensor unit 158 is provided with a bracket 36 which is comprised of box-shaped containers including a sensor container 80 for containing a preloader sensor 32 shown in FIG. 3 formed integrally with an enhancer container 188 projecting forward from the sensor container 80. The end of the enhancer container 188 opposite to the sensor container 80 is closed by a blocking wall 188A. A pair of fixing members 38 and 40 are formed integrally with and fixed to the enhancer container 188 on both widthwise sides thereof. Each of these fixing members 38 and 40 has an intermediate, semicircular section (with respect to the widthwise dimension of the vehicle body), and a round hole (not shown) is provided through the center of this semicircular section. The fixing members 38 and 40 are respectively secured to a pair of projections 46 and 48 which are provided on the top corners of the foot plate 18 with a pair of bolts 50 and 52.

As shown in FIG. 3, a partition wall 190 is integrally provided across from and contiguous with the blocking wall 188A of the enhancer container. A guide hole 192 is provided through the middle part of the partition wall 190 of the enhancer container 188, and the wire-guiding hole 194 is compatible with the guide projection of the spring complete unit 64. A hole 54 for accommodating a cylinder 56 is provided through the top wall of the enhancer container 188. The hole 54 is coaxial with the wire-guiding hole 194 and has a diameter longer than that of the wire-guiding hole 194. A female screw thread is formed on the upper portion of the internal circumferential surface of the cylinder-accommodating hole 54.

Hollow cylinder 56 is disposed with its lower end screwed into the cylinder-accommodating hole 54. Cylinder 56 consits of base region 56A, an axially intermediate region 56B, and an axial tip region 56C. The base region 56A has a diameter narrower than that of the intermediate region 56B. A male screw thread is formed on the external circumferential surface of the base region 56A for engagement with the female screw thread of the cylinder-accommodating hole 54. The tip region 56C is tapered at the ends, and in addition, an air-outlet hole 60 is provided through the axial center of cylinder 56 with an opening at the top of the tip region 56A. A slideable piston 61 (see FIG. 4) is housed in the intermediate region 56B.

Figure 4:
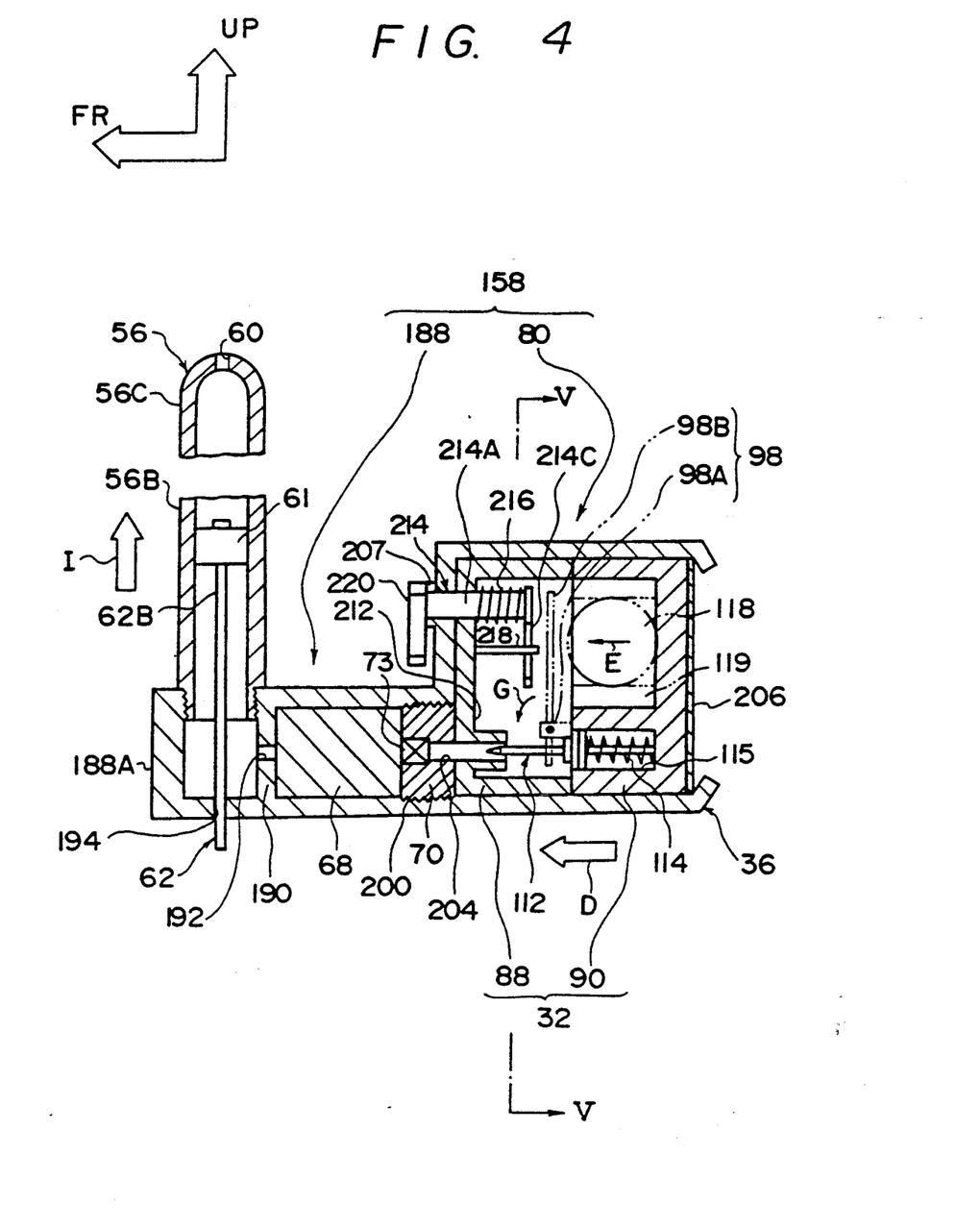
FIG. 4 is a sectional view of the preloader sensor shown in FIG. 1 taken along the line from IV to IV.
Figure 5:
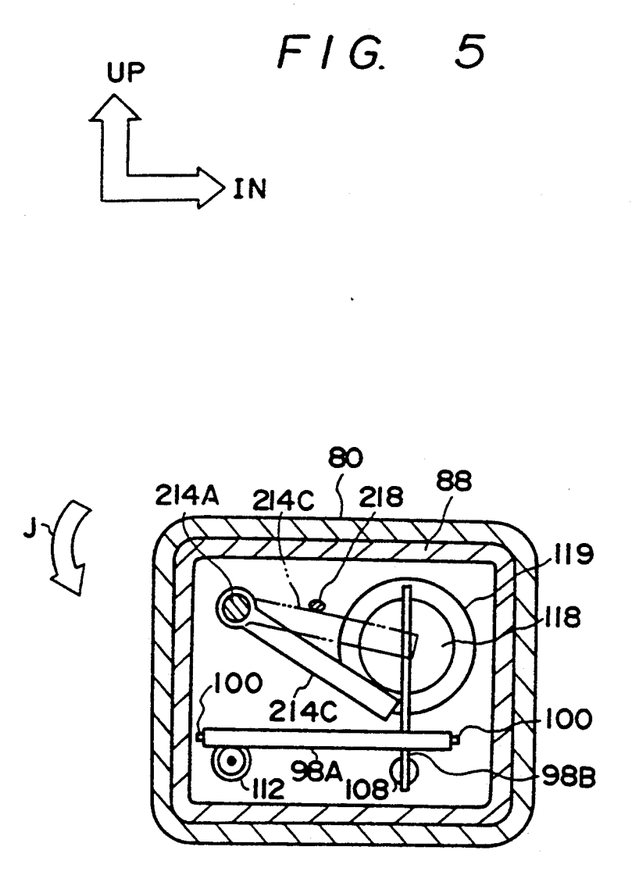
FIG. 5 is a sectional view of the preloader sensor shown in FIG. 4 taken along the line from V to V.

On the other hand, cylindrical compartment 196 is provided between the partition wall 190 of the enhancer container 188 and the end wall of the adjoining sensor container 80 for storing cylindrical enhancer 68 (comprised of gas generating material) therein. The internal circumferential surface of the joining end of the cylindrical container 196 is provided with a female screw 198 which is spirally engaged with a cylindrical blasting cap case 70 whose external circumferential surface is provided with a male screw 200. The cylindrical blasting cap case 70 is shown in FIGS. 3 and 4. A cylindrical hole 202 is provided through the axial center of the blasting cap case 70 for containing a cylindrical blasting cap 73. A guide path 204 (see FIG. 4) coaxial with the cylindrical hole 202 is provided through the blasting cap case 70 so that the guide path 204 can be contiguous with the internal space of the sensor container 80.

The sensor container 80 houses the preloader sensor 32. The edges of the rectangular aperture at the end of the sensor container 80 are sealed by inserting a tightly fitting rectangular cover 206 into the aperture (the calked condition shown in FIG. 4). A cylindrical guide member 207 projects from the enhancer container 188 at the front end of the sensor container 80.

The preloader sensor 32 housed in the sensor container 80 consists of a rectangular parallelepiped case 88 disposed in the front section thereof and another case 90 disposed in the back section thereof. The two cases are separated from each other by a planer space at an intermediate point within sensor container 80.

A guide hole 94 for guiding an ignition pin 112 to the blasting cap 73 is formed on a line coaxial with of the guide path 204 for guiding the blasting cap case 70, in the front wall of the front case 88. In addition, a rectangular parallelepiped shaft container (not shown) for storing a drive shaft 98 is provided in the front part of the front case 88, and disposed along the widthwise dimension of the vehicle body.

The drive shaft 98 is provided with a rectangular parallelepiped base 98A and a shaft 98B projecting orthongonally through the longitudinally intermediate region of the rectangular parallelepiped base 98A. A pair of small projections 100 extend longitudinally with respect to base 98A from both end surfaces thereof. These small projections 100 are rotatably held by notches formed on the insides of respective width wise sides of the shaft container (not shown).

A cylindrical hole 104 is formed through the rear case 90 orthogonal to the base 98A of the drive shaft 98 axially longitudinally with respect to the vehicle. A bias spring 106 is inserted in this cylindrical hole 104. A bias pin 108 is idly engaged with one end of the bias spring 106, while the other end of the bias spring 106 is engaged with the surface of the rear wall of the rear case 90. By virtue of this mechanism, the bias spring 106 urges the bias pin 108 in the arrow C direction shown in FIG. 3.

The front tip of the bias pin 108 remains in contact with a portion of the shaft 98B adjacent to one axial-end thereof. A flange 112A of a shaft-shaped ignition pin 112 is engaged with the longitudinally intermediate region of the base 98A of the drive shaft 98. The ignition pin 112 is idly engaged with one end of a compression coil spring 114. The other end of the compression coil spring 114 is inserted in a spring container 115 formed inside of the rear case 90. Because of this mechanism, the compression coil spring 114 urges the ignition pin 112 in the arrow D direction shown in FIG. 4.

An internal ball 118 remains in contact with a portion of the shaft 98B adjoining the other axial end thereof. When the vehicle speed quickly decelerates, the ball 118 moves inertially forward in the arrow E dirction shown in FIG. 4. The inertial ball 118 is held by a cylinder 119 which is inserted in a cylindrically shaped cylinder container 208. A slit 210 is provided on the circumferential surface of the cylinder 119 in the axially intermediate region thereof. An O-ring 211 is inserted into the slit 210 so that space between the internal circumferential surface of the cylinder container 208 and the cylinder 119 can be sealed.

A rectangular parallelepiped storage space 212 (see FIG. 4) is provided close to the path to the inertial ball 118 in the direction of its inertial movement. A through hole 213 is provided through the end wall of the front case 88 of the enhancer container 188, and the through hole 213 is linked to the space 212 shown in FIG. 4. The space 212 accommodates the second releasing lever 214 and a return spring 216.

The second releasing lever 214 consists of a cylindrical base 214A, a cubically shaped coupling member 214B which axially projects from one axial end of the cylindrical base 214A, and a lever member 214C which projects radially from the other axial end of the cylindrical base 214A. The base 214A of the second releasing lever 214 is rotatably inserted into the through hole 213 and the guide member 207 by means of axial rotation. The coupling member 214B is axially disposed, so as to project forward, beyond the front end wall of the guide member 207. The lever member 214C is disposed above the path of inertial movement of the ball 118. A stopper (see FIG. 5) projecting from the storage space 212 is positioned so as to interfere with the rotation of the lever member 214C.

The coil 216A of the return spring 216 is wound on the base 214A of the second releasing lever 214. One end of this return spring 216 is secured in a small hole (not shown) close to the through hole 213 (see FIG. 3) of the front case 88. The other end of the return spring 216 is secured to the lever member 214C. Because of this mechanism, the return spring 216 urges the second releasing lever 214 in the arrow J direction in the structural diagrams shown in FIGS. 3 and 5.

The first releasing lever 220 is coupled with a coupler member 214B of the second releasing lever 214. The first releasing lever 220 consists of a cylindrical base member 220A and a curved member 220B projecting radially from part of the external circumference of the base member 220A. A cubic coupling hole 222 extends axially through the base member 220A, for engagement with the coupling member 214B of the second releasing member 214. As a result, the first releasing lever rotates in conjunction with the second releasing lever 214. The curved member 220B is rectangular. While the lever member 214C of the second releasing lever 214 is held in engagement with the stopper 218 by the force exerted by the return spring 216, an end of the curved member 220B away from the base member 220A is positioned in parallel with a holder member 224B of an upper stay 224 to be described below. The first releasing lever unit 220 is installed above the upper stay unit 224 in this embodiment, as shown in FIG. 1.

As shown in FIG. 1, the upper stay unit 224 is disposed above the pair of foot plates 18 and 20 inside the vehicle cabin. The upper stay unit 224 is composed of the following; a base member 224A which is made of a window-frame shaped steel plate having a rectangular aperture 226 in the center. The steel plate is orthogonally bent across the widthwise center line, and a holder member 224B projects vertically from the longitudinally intermediate region of the base plate 224A.

A pair of calking holes 228 are provided at both longitudinal ends of the base member 224A. A pair of forked projections 230 are inserted through the calking holes 228 from the edges of the inward facing ends of the foot plates 18 and 20. Respective prongs of each pair of these forked projections 230 are separately bent over in opposite directions from each other so that the upper stay unit 224 can be tightly secured to the foot plates 18 and 20. The webbing 26 is inserted into the aperture 226 of the base member 224A. A wide through hole 232 is provided through the holder member 224B.

Figure 6:
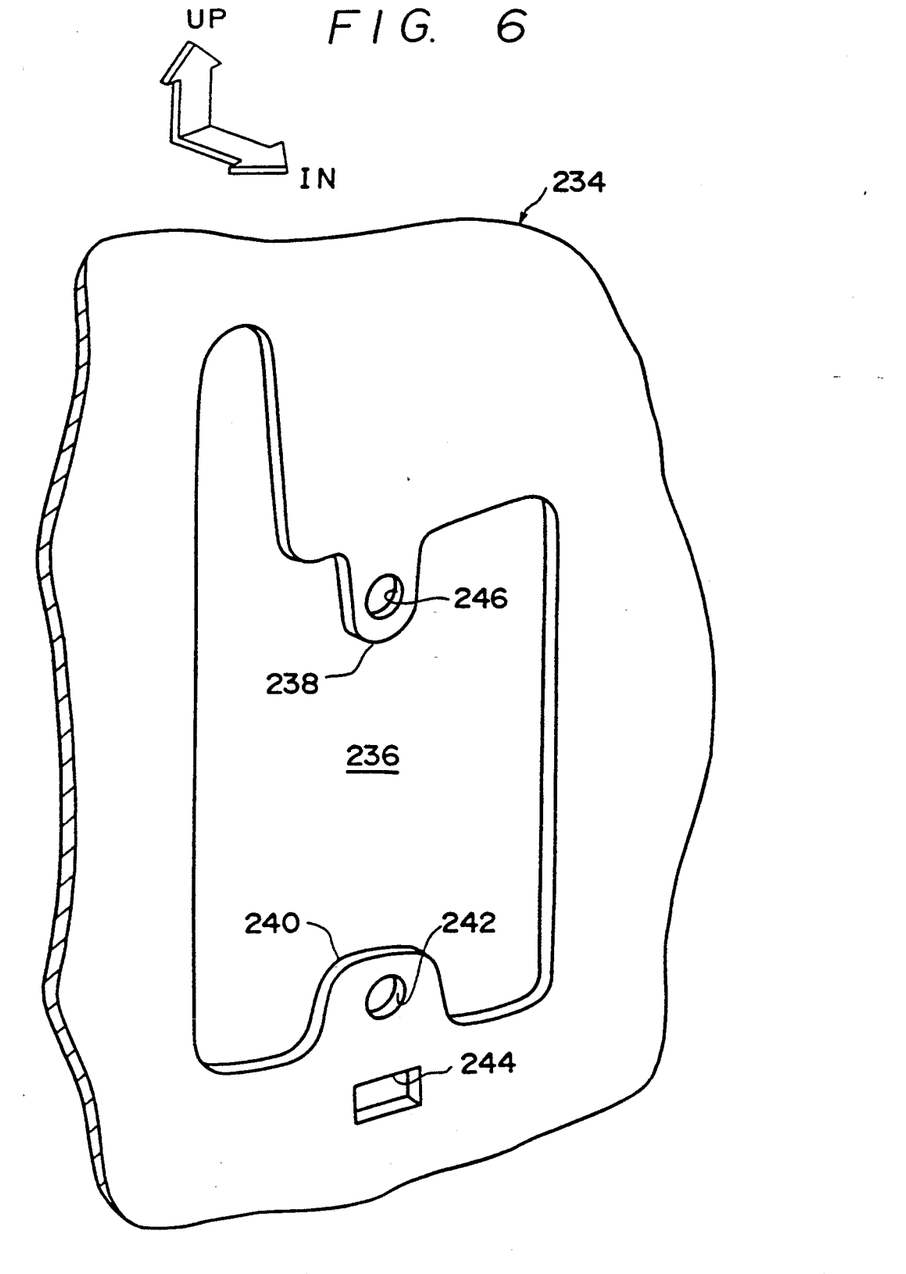
FIG. 6 is a schematic perspective view illustrating the lower region of the lateral wall of a vehicle body to which the webbing retractor shown in FIG. 1 is secured.

Refer now to FIG. 6, in which the webbing retractor 10 with the mechanical structure thus far described is installed below a lateral wall 234 of the vehicle body. A rectangular aperture 236 is provided below the lateral wall 234 of the vehicle body so that the webbing 26 can be inserted through this aperture 236. A pair of upper and lower holders 238 and 240 are formed as projections at respective longitudinally opposite ends of the aperture, projecting towards each other so that the webbing retractor 10 can be held securely thereby.

A bolt inserting hole 242 is provided through the center of the lower holder 240. A welding nut 243 (see FIGS. 7 and 8) is fused onto the external surface of the lower projection 240. A fixing bolt 252 is inserted into the lower bolt holder through-hole 242 and the bolt-inserting hole 154 of the semicircular projection 150 of the main frame 12. The fixing bolt 252 is further secured to the welding nut 243. A rectangular hole 244 is provided below the lower holder projection 240, and the hook member 152 of the main frame 12 of the webbing retractor is engaged with this rectangular hole 244 (see FIG. 8).

The upper holder projection 238 is narrower in width than the lower holder projection 244. A through hole 246 is provided through the center of the upper holder projection 238 for allowing insertion of a releasing bolt. A welding nut 248 (see FIGS. 7 and 8) is fused on the external surface of the lower holder projection 240 in a position coaxial with the releasing bolt inserting hole 246. A releasing bolt 250 is inserted into the through hole 246 shown in FIG. 6 and the other through hole 232 shown in FIG. 1, and the releasing bolt 250 is secured to the welding nut 248.

Figure 9:
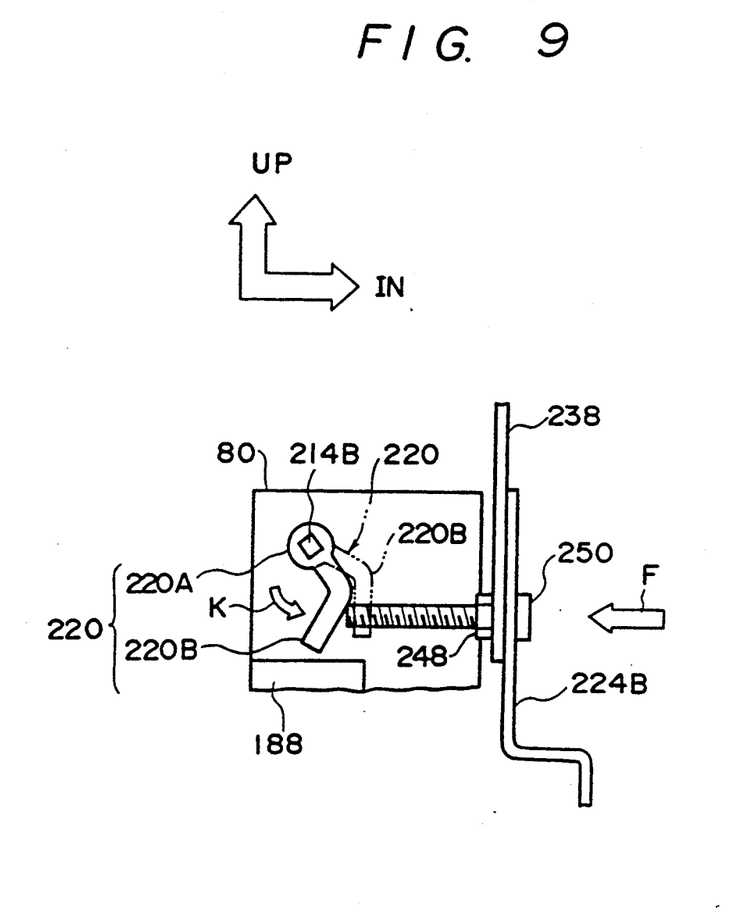

The curved member 220B of the first releasing lever unit 220 is provided in a position at which it is capable of being thrust by the releasing bolt 250 (in the arrow F direction shown in FIG. 9).

The webbing retractor 10 is now complete, with provision of the preloader unit 28 incorporating the preloader sensor 32 consisting of those structural components mentioned above. Furthermore, the webbing retractor 10 is additionally provided with a vehicle speed sensor which detects decelerating vehicle speed and a locking mechanism which is activated by this speed sensor to instantaneously inhibit the winding shaft from rotating in the direction of unwinding the webbing (not shown).

When the webbing retractor 10 embodied by the invention is applied to a continuous webbing three-step seat belt system, the end of the webbing 26 drawn out of the winding shaft 22 is attached to the vehicle body via an anchor member (not shown). An intermediate part of the webbing 26 is folded back by means of a slip joint (not shown) attached to the vehicle body, and at the same time, a tongue plate (not shown) is slidably installed on the webbing between the anchor member and the slip joint opened longitudinally. When the vehicle driver in the driver's seat engages the tongue plate with the buckle unit of the seat belt device after pulling out the webbing 26 from the winding shaft 22, the driver is tightly held with the webbing 26.

Figure 7:
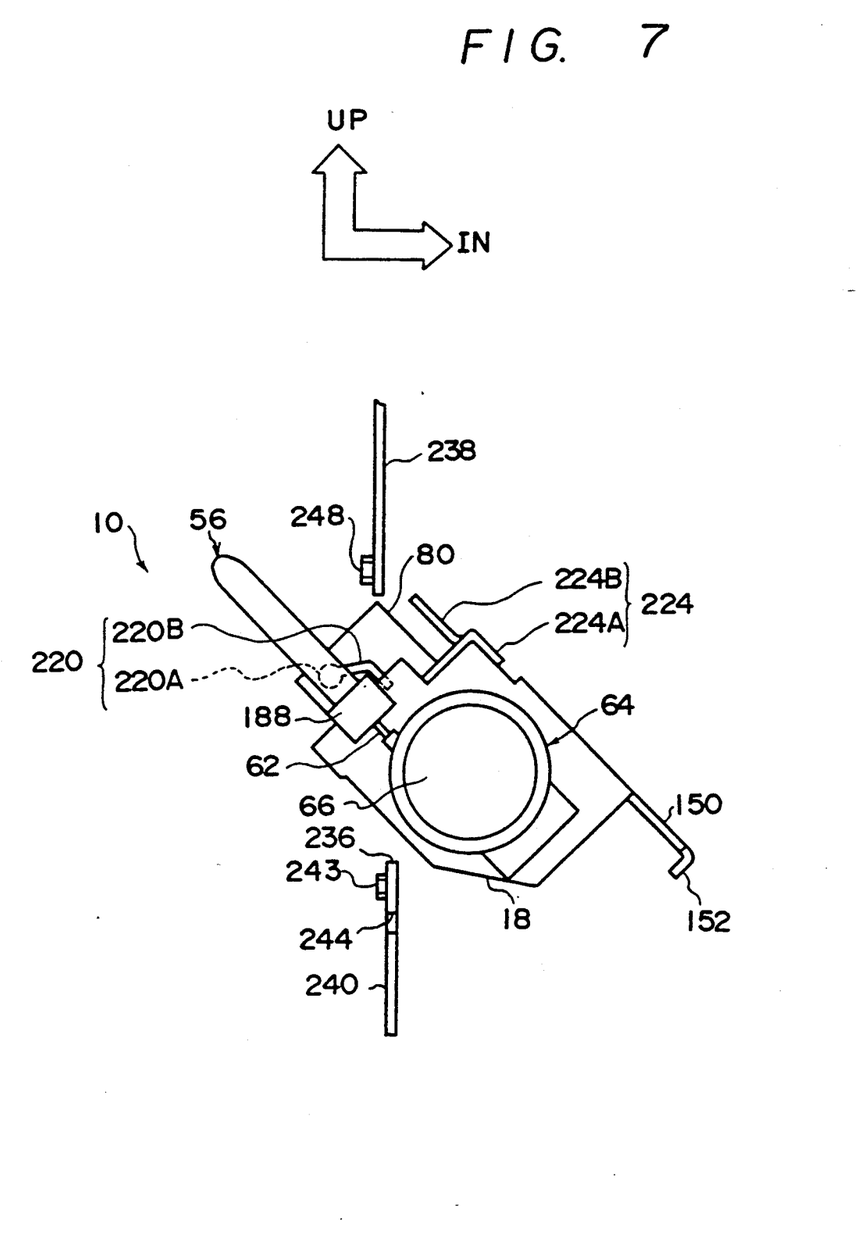
FIGS. 7 through 9 respectively, are explanatory of the operations for securing the webbing retractor to the lower region of the lateral wall of a vehicle body shown in FIG. 6.
Figure 8:
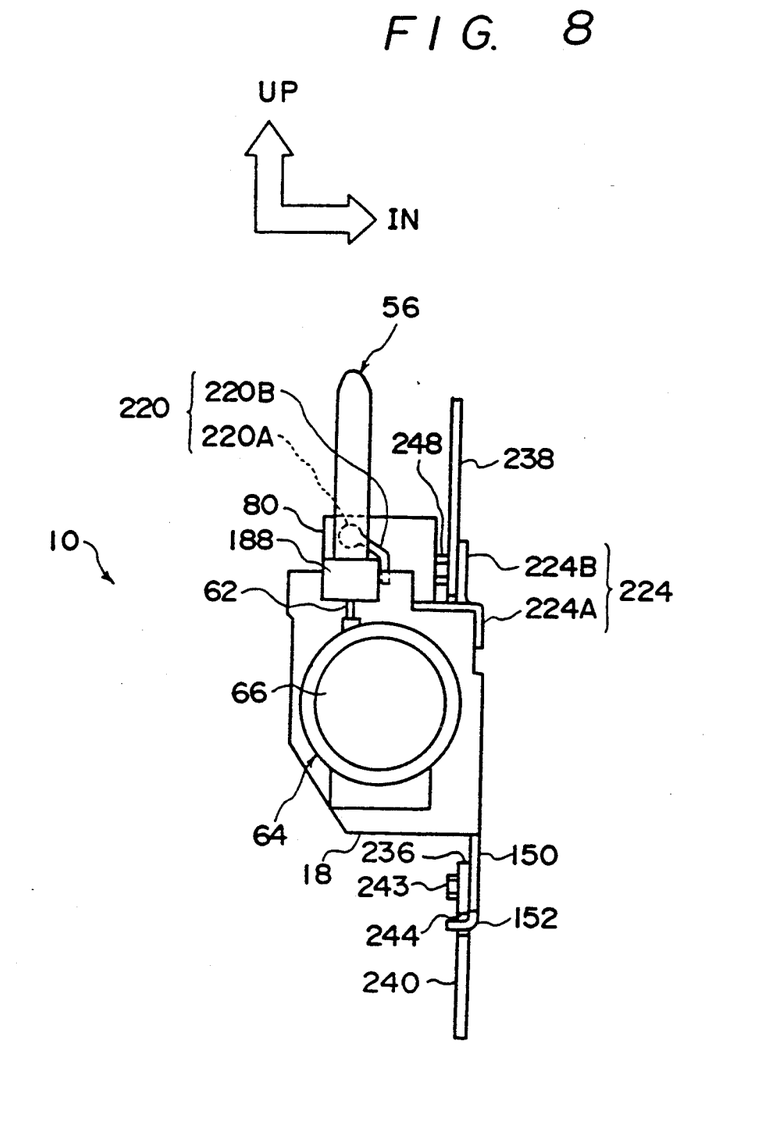

Next, the functional operation of the webbing retractor 10 and the mechanism for installing the webbing retractor 10 in the vehicle body are described below. In order to secure the webbing retractor 10 to the bottom part of the lateral wall 234 of the vehicle, the following steps are taken: First, as shown in FIG. 7, while keeping the webbing retractor 10 oblique at a predetermined angle with respect to the vertical axis of the vehicle body, the frame body 12 (except for the middle part) is inserted into the aperture 236. Then, the hole 232 of the holder member 224B of the upper stay unit 224 is positioned in such a way that the hole 232 correctly matches the releasing-bolt inserting hole 246 of the upper holder member 238 for holding the webbing retractor 10. Then, after the hook 152 of the main frame body 12 is coupled with the rectangular hole 244 of the lateral wall 234 of the vehicle body, the webbing retractor 10 is re-positioned from the oblique position to a vertical position. FIG. 8 illustrates the resulting position of the webbing retractor 10. In this arrangement, the fixing-bolt inserting hole 242 of the lower holder member 240 is coaxial with the fixing-bolt inserting hole 154 of the semicircular projection 150 of the main frame 12. When the hook 152 is coupled with the rectangular hole 244, the hook 152 functions to inhibit the turning of the webbing retractor 10. While this condition is present, the fixing bolt 252 is in the hole 242 of the lower holder projection 240 and the hole 154 of the semicircular projection 150, and is screwed into the welding nut 243.

Next, the releasing bolt 250 is inserted into the hole 232 of the holder member 224 of the upper stay unit 224 and the releasing-bolt inserting hole 246 of the upper holder member 238 before being screwed into the welding nut 248. The hole 232 of the holder member 224 is elongated to absorb error in the engagement of the upper stay unit 224 with the webbing retractor 10.

While the axial tip of the releasing bolt 250 is positioned away from the curved member 220B of the first releasing lever 220, the return spring 216 exerts force on the curved member 220B via the second releasing lever 214 so that the curved member 220B can stay at the position shown in FIG. 9 with a partially dotted line. By means of this mechanism, the second releasing lever 214 cannot rotate in the direction opposite from the arrow J direction shown in FIG. 3 in resistance against the force exerted by the return spring 216. In consequence, the lever member 214C of the second releasing member 214 stays at the position shown in FIG. 5 with a partially dotted line, thus preventing the drive shaft 98 from rotating in the arrow G direction due to the inertial movement of the ball 118. As a result, as long as the curved member 220B of the first releasing lever 220 is not interfered with by the releasing bolt 250, the preloader sensor 32 is fully inhibited from executing functional operation.

On the other hand, while the releasing bolt 250 is on the way of movement in the arrowed direction F shown in FIG. 9, the axial tip of the releasing bolt 250 comes into contact with the curved member 220B. After coming into contact therewith, the releasing bolt 250 further proceeds in the arrow F direction, and thus the first releasing lever 220 rotates in the direction opposite from the arrow K direction shown in FIG. 9, in resistance against the force exerted by the return spring 216. When the releasing bolt 250 is in a fully inserted position, the curved member 220B has rotated from the position shown in FIG. 9 with a partially dotted line to the position shown by the solid line. While this condition is present, the lever member 214C of the second releasing lever 214 has rotated in the direction opposite from the arrow J direction shown in FIG. 5 from the position shown by a partially dotted line to the position shown by the solid line. As a result of this mechanism, the lever member 214C no longer interferes with the shaft 98B of the drive shaft 98. This allows the preloader sensor 32 to enter into an operational condition so that the driver can safely drive the vehicle.

After the webbing 26 has been fixed in place, when the driver drives the vehicle under normal conditions, the winding shaft 22 can be rotated in the directions of winding and unwinding the webbing 26 without any restrictions. By virtue of this mechanism, since the webbing 26 can be freely unwound from and wound onto the winding shaft 22 in response to changes of the posture of the driver in the driver's seat, no constraint is applied to the driver at all.

However, when the vehicle speed quickly decelerates, the ball 118 moves inertially in the arrow E direction shown in FIG. 4, and as a result, the drive shaft 98 rotates in the arrow G direction (see FIG. 4) in resistance against the force exerted by the bias spring 106, thus causing the collar 112A of the ignition pin 112 to be disengaged from the base member 98A of the drive shaft 98. As a result, the ignition pin 112 is driven in the arrow D direction shown in FIG. 4 by the force exerted by the compression coil spring 114 so as to collide with the blasting cap 73 and cause it explode. Then, the spark caused by the explosion of the blasting cap 73 triggers a reaction by the enhancer (gas-generating material) 68 of instantaneously generating a large volume of gas, which is then fed into the cylinder 56 via the gas guide hole 190 to press the piston 61 upward in the arrow I direction shown in FIG. 4.

As a result, the wire 62 is instantaneously pulled upward to give tension to the intermediate region of the wire 62 wound on the winding member 170 of the rotary drum 168, thus transmitting the tensile force of the wire 62 to the rotary drum 168. This causes the rotary drum 168 to rapidly rotate in the webbing-retracting direction (in the arrow B direction shown in FIG. 2) of the winding shaft 22. Simultaneously, the tension applied to the intermediate region of the wire 62 causes the wire 62 to tightly wind around the projection 182 of the pole lever 178, causing the pole lever 178 to move axially with respect to the rotary drum 168 in resistance against the force exerted by the twisted coil spring 184. This in turn causes the claw 180 of the pole lever 178 to engage with the latchet teeth 162A of the latchet wheel 160, and as a result, the rotating force of the rotary drum 168 in the webbing-retracting direction is quickly transmitted to the latchet wheel 160.

In this process, since the recess 177 of the flange 172 of the rotary drum 168 matches the projection 182, even when the claw 180 of the pole lever 178 rotates at the periphery of the pin 176, in a direction approaching the latchet teeth 162A, there is no possibility of the projection 182 obstructing the rotation of the pole lever 178 by entering the recess 177.

When the rotating force of the winding shaft 22 in the webbing-retracting direction is transmitted to the latchet wheel 160 by the rotation of the rotary drum 168, the winding shaft 22 linked with the latchet wheel 160 is quickly rotated in the webbing-retracting direction in conjunction with the rotation of latchet wheel 160. As a result, the webbing 26 is forcibly pulled in the retracting direction to tightly constrain the driver.

At the same time, as a result of the inertial movement of the driver himself, although the webbing 26 is apt to be pulled out of the webbing retractor 10, a locking mechanism (not shown) is activated to instantaneously inhibit the winding shaft 22 from rotating in the unwinding direction of the webbing 26. As a result, the driver is securely constrained by the fastened webbing 26.

When removing the webbing retractor 10 from its position on the lateral wall 23 of the vehicle body, first, the releasing bolt 250 is removed from the upper holder member 238. Next, in proportion to the screwing out movement of the releasing bolt 250 in the direction opposite from the screwing in direction (in the arrow F direction shown in FIG. 9), the curved member 220B of the first releasing lever 220 gradually rotates in the arrow K direction shown in FIG. 9, pivoting around the junction 214B. When the releasing bolt 250 is fully disengaged from the holder member 224B of the upper stay unit 224, the curved member 220B has rotated from the position shown by the solid line to the position shown by the partially dotted line of FIG. 9 by the force exerted by the return spring 216, thus totally inhibiting the preloader sensor 32 from executing functional operation.

Next, the fixing bolt 252 is unscrewed from the lower holder member 240 to allow the hook 152 of the main frame 12 to be disengaged from the rectangular hole 244, enabling removal of the webbing retractor 10 from the lateral wall 234 of the vehicle body.

As is clear from the above description, the art embodied by the invention provides a double function comprising the attachment of the webbing retractor 10 to the lateral wall 234 of the vehicle body and the control of a safety mechanism which causes the preloader sensor 32 to enter into an operational conditiona and a non-operational condition as required. By virtue of the structural advantages described above, the preloader sensor 32 cannot be activated unless the webbing retractor 10 is perfectly secured to the lateral wall 234 of the vehicle body.

Owing to the above mechanism, even if vibration is transmitted to the preloader sensor 32 in the course of installing or removing the webbing retractor 10 on and from the lateral wall 234 of the vehicle body, there is no fear of causing the preloader sensor 32 to malfunction. Likewise, even when the webbing retractor 10 is manually transported, there is no fear of causing the preloader sensor 32 to malfunction as a result of vibration generated during transportation. In consequence, the safety and reliability of this device can be secured during transportation, assembly, and operation.

The description of the above embodiment has referred solely to the application of the preloader sensor 32, to the webbing retractor 10. However, it is also possible in an embodiment of the invention to combine the webbing retractor 10 with an air-bag system and to provide a system for feeding gas from the gaseous enhancer 68 into the bag of the air-bag system.

What is claimed is:

1. A preloader sensor which is applied to a webbing retractor for winding a webbing for constraining a vehicle passenger onto a winding shaft in stratified form in order to tightly constrain a passenger with said webbing instantaneously upon detecting quickly decelerating vehicle speed, comprising;
    a sensor unit which incorporates a mechanism for detecting quickly decelerating vehicle speed;
    a releasing means which is displaceably installed so as to be adjustable by the application of external force, to enable and disable said sensor unit for detecting decelerating vehicle speed, based on the predetermined amount of displacement; and
    an urging means which constantly urges said releasing means towards a specific position in which said releasing means cannot execute detection of vehicle speed.

2. A preloader sensor according to claim 1, wherein said releasing means is subject to displacement by the application of external pressure thereto.

3. A preloader sensor according to claim 1, wherein said releasing means is subject to displacement from one to the other of two specific positions enabling detection of vehicle speed and inhibiting detection of vehicle speed.

4. A preloader sensor according to claim 3, wherein said releasing means is subject to axial displacement between two specific positions allowing detection of vehicle speed and inhibiting detection of vehicle speed respectively.

5. A preloader sensor according to claim 1, wherein said releasing means is installed in such a way as to project outward from said preloader sensor.

6. A preloader sensor according to claim 2, wherein said releasing means comprises;
    a first member which is displaceable from one to the other of a position receiving said external pressure and a position free of said external pressure; and
    a second member which operates in conjunction with said first member to cause said sensor unit to enter into detection-capable condition at the position where said first member is subject to external pressure and into detection-incapable condition at the position where no external pressure is applied to said first member.

7. A preloader sensor according to claim 1, wherein said urging means comprises a return spring.

8. A preloader sensor which is applied to a webbing retractor for winding a webbing for constraining a vehicle passenger onto a winding shaft in stratified form in order to activate operation of a preloader for tightly constraining a passenger with said webbing upon instantaneously detecting quickly decelerating vehicle speed, comprising;

a sensor unit which incorporates a mechanism for detecting quickly decelerating vehicle speed, said mechanism incorporating a mass substance and a mass-substance receiving member capable of receiving displaced mass substance and detecting quickly decelerating vehicle speed as a result of displacement of the position of said mass substance receptive member which takes place simultaneously with quick deceleration of the vehicle speed;

a releasing means which causes said mass-substance receiving member to enter into a displaceable condition and an undisplaceable condition, wherein said releasing means causes said mass-substance receiving member to enter into said displaceable condition when said releasing means is moved to a specific position as a result of receiving a predetermined amount of external pressure, in order to make said mass-substance receiving member operative unless and until said releasing means is returned to a position free of external pressure, and said releasing means is movable from one to the other of a pressure-receiving position and a pressure-absent position; and an energizing means which constantly exerts a force on said releasing means and moves said releasing means when said releasing means is at said pressure absent position free of said external pressure.

9. A preloader sensor according to claim 8, wherein said releasing means is axially displaceable between said pressure-receiving position and said pressure-absent position.

10. A preloader sensor according to claim 8, wherein said releasing means is installed in such a way as to project outward from said preloader sensor.

11. A preloader sensor according to claim 8, wherein said releasing means comprises;
a first member which is displaceable from one to the other of said pressure receiving position and said pressure absent position; and
a second member which operates in conjunction with said first member to cause said mass-substance receiving member to enter into a displaceable condition when said first member is moved to said position where said first member is subject to said external pressure and an undisplaceable condition if and when said first member returns to said pressure absent position where said first member is free of said external pressure.

12. A preloader sensor according to claim 11, wherein said first member comprises a first releasing member.

13. A preloader sensor according to claim 11, wherein said second member comprises a second releasing member.

14. A preloader sensor according to claim 8, wherein said energizing means comprises a return spring.

15. A mechanical structure for securing a webbing retractor to a vehicle body, wherein said webbing retractor incorporates a preloader sensor which activates operation of a preloader for tightly constraining a vehicle passenger with a webbing when vehicle speed quickly decelerates, wherein said mechanical structure comprises;
a joining means which joins said webbing retractor to a vehicle body; and a releasing means which is disposed in said preloader sensor, for causing said preloader sensor to enter into an operation-incapable condition and an operation capable condition, wherein said preloader sensor enters into said operation-capable condition only when said webbing retractor is joined to the vehicle body by said joining means, whereas said preloader sensor enters into said operation-incapable condition when said webbing retractor and the vehicle body are not joined by said joining means.

16. A mechanical structure for securing a webbing retractor to a vehicle body according to claim 15, wherein said releasing means comprises;
an interfering member which is disposed in relation to a moving locus on said joining means, and which moves out of an interfering position at which said preloader sensor is in an operation-incapable condition and into a non-interfering position at which said preloader sensor is in an operation-capable condition, as a result of the movement of said joining means and said moving locus by a predetermined distance, such that said joining means is at a joining position where the joining of said webbing retractor to the vehicle body is complete.
an operational condition determining means which operates in conjunction with said interfereing member to cause said preloader sensor to enter into an operative condition at the position where said interfering member is moved to said non-interfering position by said joining means and into an inoperative condition at the position where said interfering member is moved to said interfering position by said joining means.

17. A mechanical structure for securing a webbing retractor to a vehicle body according to claim 16, further comprising;
an energizing means which exerts a force on said interfering means in the direction of a specific position at which operation of said preloader sensor is prevented, wherein said interfering means is moved to said non-interfering position as a result of the movement of said joining means to said joining position in resistance against the force exerted by said energizing means, and wherein, when said joining means moves to a position at which joining is not complete, said interfering member is moved to said interfering position, at which it is free of influence from said joining means, as a consequence of the force exerted by said energizing means.

18. A mechanical structure for securing a webbing retractor to a vehicle body according to claim 15, wherein said union means comprises a releasing bolt.

19. A mechanical structure for securing a webbing retractor to a vehicle body according to claim 16, wherein said interfering member comprises a first releasing means.

20. A mechanical structure for securing a webbing retractor to a vehicle body according to claim 16, wherein said operation-determining member comprises a second releasing means.

21. A mechanical structure for securing a webbing retractor to a vehicle body according to claim 17, wherein said energizing means comprises a return spring.

* * * * *